United States Patent
Obrist et al.

(10) Patent No.: US 9,103,276 B2
(45) Date of Patent: Aug. 11, 2015

(54) MACHINE COMBINATION COMPRISING AN INTERNAL COMBUSTION ENGINE AND A GENERATOR

(75) Inventors: Frank Obrist, Lustenau (AT); Bernd Praesent, Oberweg (AT)

(73) Assignee: OBRIST POWERTRAIN GMBH, Lustenau (AU)

( * ) Notice: Subject to any disclaimer, the term of this patent is extended or adjusted under 35 U.S.C. 154(b) by 75 days.

(21) Appl. No.: 13/882,304

(22) PCT Filed: Sep. 13, 2011

(86) PCT No.: PCT/IB2011/002147
§ 371 (c)(1),
(2), (4) Date: Jul. 8, 2013

(87) PCT Pub. No.: WO2012/056275
PCT Pub. Date: May 3, 2012

(65) Prior Publication Data
US 2013/0319349 A1    Dec. 5, 2013

(30) Foreign Application Priority Data

Oct. 29, 2010  (CH) ..................... 01813/10

(51) Int. Cl.
*F02B 63/00* (2006.01)
*F02B 43/08* (2006.01)
(Continued)

(52) U.S. Cl.
CPC . *F02B 63/04* (2013.01); *B60K 6/24* (2013.01); *F01L 1/024* (2013.01); *F01L 1/047* (2013.01);
(Continued)

(58) Field of Classification Search
CPC .. F02B 63/04; F02B 2063/045; F02B 63/044; F02B 77/13; F02B 75/16; F02B 73/00; F02B 3/06; F02B 75/065; F02B 43/10; F02B 1/04; F02B 43/08; F02M 27/02; F02M 25/12
USPC .................................. 123/2, 3, 59.6
See application file for complete search history.

(56) References Cited

U.S. PATENT DOCUMENTS 3,983,852 A   10/1976 Chatourel
4,331,111 A   5/1982  Bennett
(Continued)

FOREIGN PATENT DOCUMENTS

DE   4344630   7/1994
FR   2257788   8/1975
(Continued)

OTHER PUBLICATIONS

International Search Report for PCT/IB2011/002147, English translation attached to original, Both completed by the European Patent Office on Jan. 12, 2012, All together 7 Pages.
(Continued)

*Primary Examiner* — Lindsay Low
*Assistant Examiner* — Syed O Hasan
(74) *Attorney, Agent, or Firm* — Katten Muchin Rosenman LLP

(57) ABSTRACT

The machine combination of an internal combustion engine and the generator of a hybrid drive has two cylinder-piston units, which are arranged parallel to each other in a common housing and each piston of which has a drive connection to an individual crankshaft via connecting rods associated with the pistons. The crankshafts have a counter-rotational connection to each other by gears. This coupling of the two crankshafts by gears allows the internal combustion engine to be combined with a generator in a particularly compact design, in that the shaft of the generator bears a gear, which is arranged in the same plane as the gears of the crankshafts.

16 Claims, 5 Drawing Sheets

Figure 3:
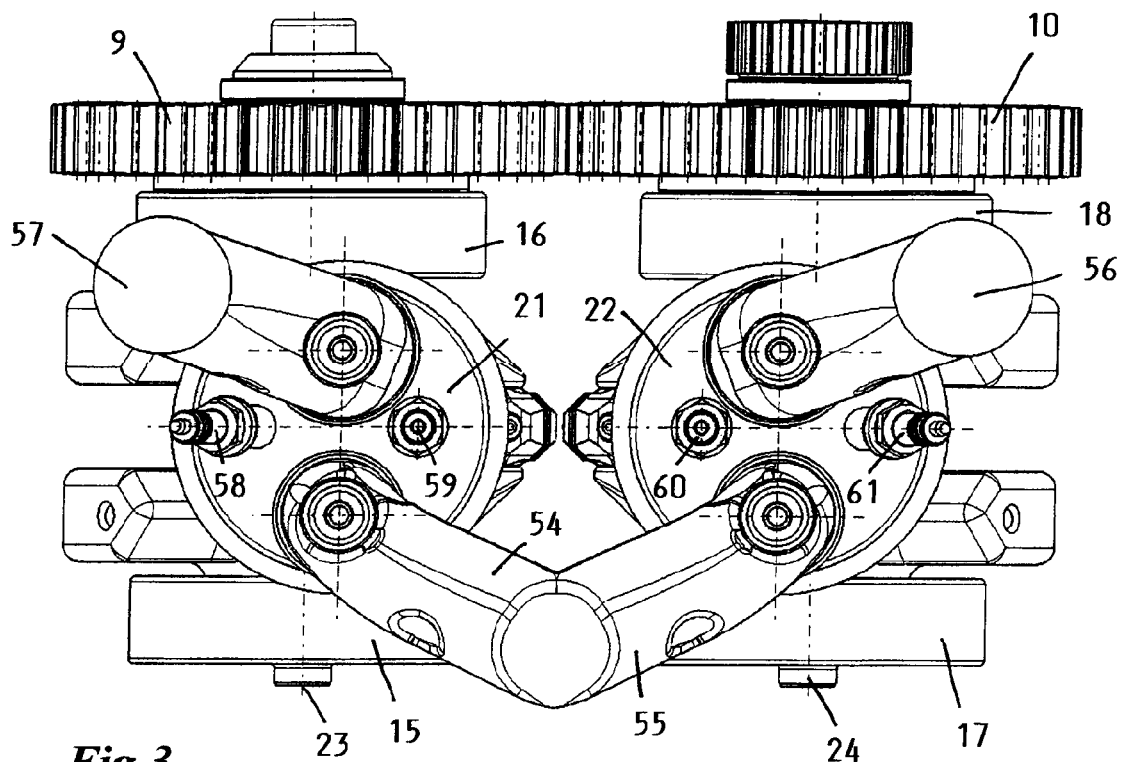

(51) Int. Cl.
  *F02B 75/20* (2006.01)
  *F02B 63/04* (2006.01)
  *B60K 6/24* (2007.10)
  *F01L 1/02* (2006.01)
  *F01L 1/047* (2006.01)
  *F01L 1/18* (2006.01)
  *F02B 75/22* (2006.01)
  *F02B 73/00* (2006.01)
  *F02B 77/13* (2006.01)

(52) U.S. Cl.
  CPC . *F01L 1/18* (2013.01); *F01L 1/181* (2013.01); *F02B 75/225* (2013.01); *F02B 75/228* (2013.01); *F01L 2105/00* (2013.01); *F02B 73/00* (2013.01); *F02B 77/13* (2013.01); *F02B 2063/045* (2013.01); *Y02T 10/6295* (2013.01)

(56) References Cited

U.S. PATENT DOCUMENTS

| | | | |
|---|---|---|---|
| 5,873,332 A | 2/1999 | Taue et al. | |
| 5,887,564 A | 3/1999 | Kawamoto | |
| 7,584,724 B2 * | 9/2009 | Berger | 123/48 R |
| 8,413,619 B2 * | 4/2013 | Cleeves | 123/78 F |
| 2002/0023599 A1 | 2/2002 | Laimbock | |
| 2008/0202456 A1 * | 8/2008 | Diggs | 123/90.16 |
| 2009/0107426 A1 * | 4/2009 | Berger et al. | 123/52.4 |

FOREIGN PATENT DOCUMENTS

| | | |
|---|---|---|
| GB | 463278 | 3/1937 |
| GB | 584215 | 1/1947 |
| JP | 6045727 | 3/1985 |
| JP | 6397829 | 4/1988 |
| JP | 0457636 | 5/1992 |
| JP | 2003083105 | 3/2003 |
| JP | 2003120317 | 4/2003 |
| WO | 2007080603 | 7/2007 |

OTHER PUBLICATIONS

Beitz et al. Dubbel Paperback for Engineering Jan. 1, 1983, Volume and Issue No. 15. Print Run, p. 719, Chapter 1.1 and p. 722, Table 3 All together 5 Pages, "Torque Chart Multi Cylinder Machines."

* cited by examiner

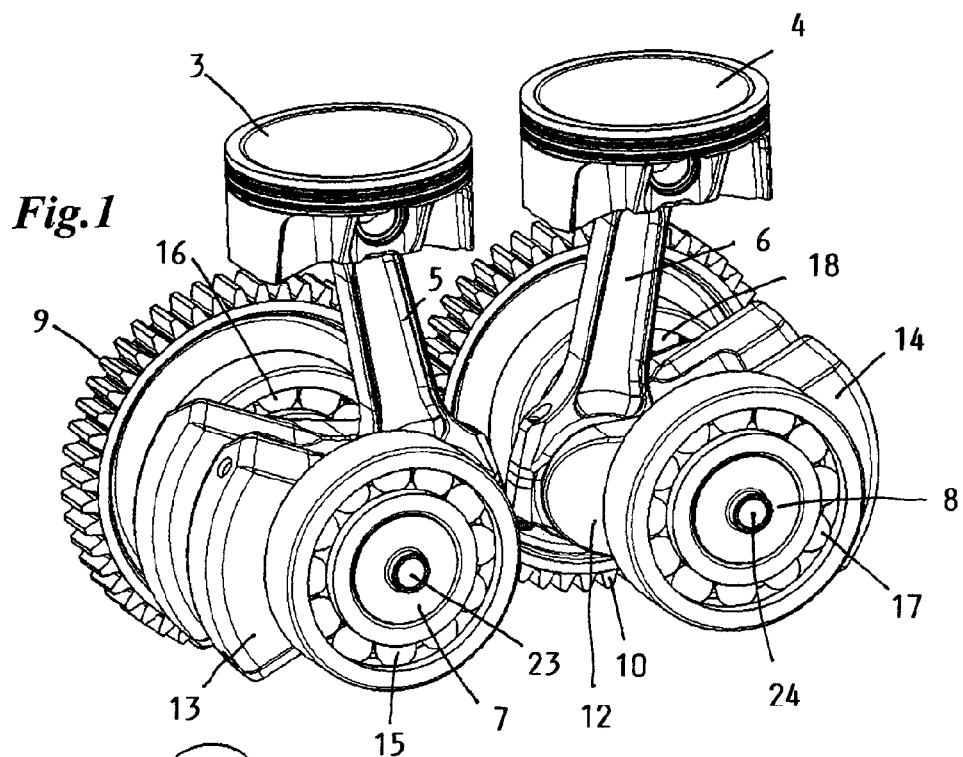

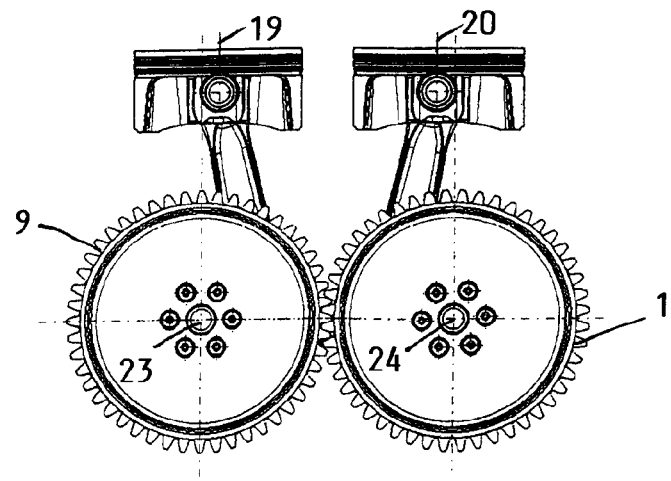
*Fig.9*
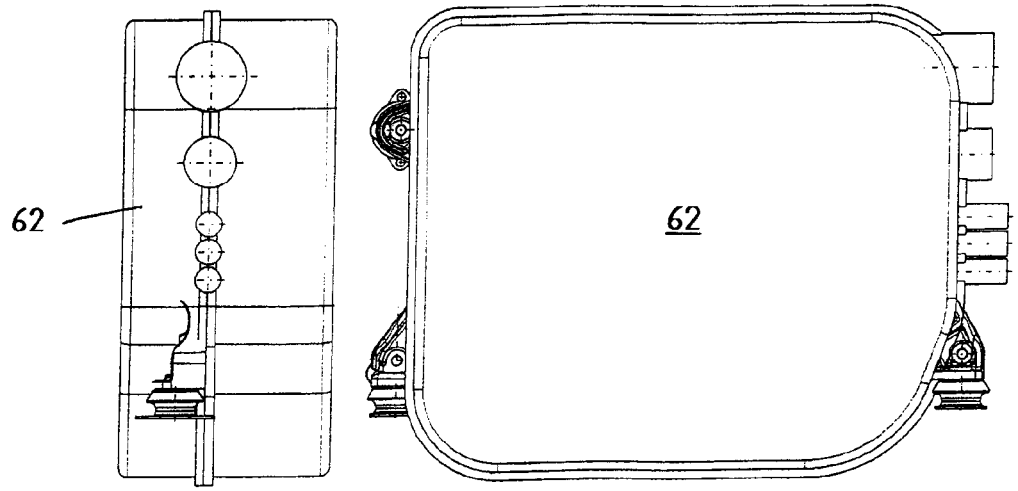
*Fig.10*
*Fig.11*
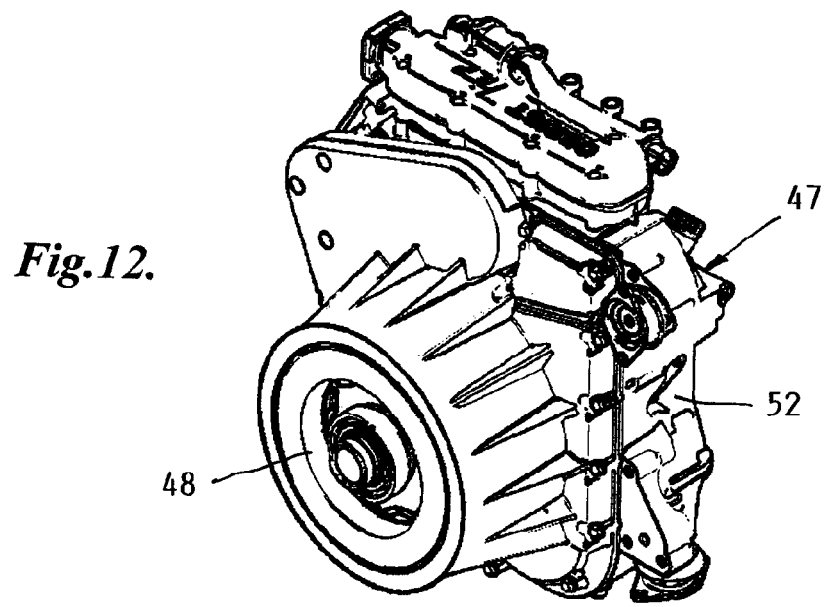
*Fig.12.*

MACHINE COMBINATION COMPRISING AN INTERNAL COMBUSTION ENGINE AND A GENERATOR

CROSS-REFERENCE TO RELATED APPLICATION

This application is the U.S. national phase of PCT Appln. No. PCT/IB2011/002147 filed on Sep. 13, 2011, which claims priority to Swiss Patent Application No. 01813/10 filed on Oct. 29, 2010, the disclosures of which are incorporated in their entirety by reference herein.

The invention relates to a machine combination comprising an internal combustion engine and a generator for charging the battery of a hybrid drive, in which machine combination the internal combustion engine has a pair of cylinder/piston units which are enclosed in a common housing and the two pistons of which are drive-connected via a connecting rod to in each case one dedicated crankshaft, and the two crankshafts are rotationally connected to one another so as to rotate in opposite directions via in each case one gearwheel.

An internal combustion engine of the stated type which is intended for a motorcycle drive is known from GB 584215. Since both the two pistons and the two balancing weights of their crankshafts which run parallel to one another are arranged offset with respect to one another in the longitudinal direction of the shaft, the inertial forces of a machine of this type are not balanced for smooth running and are not particularly suitable for direct coupling to a generator.

The invention is based on the object of finding a machine combination of the type stated at the outset, which machine combination has a particularly smooth, that is to say low-noise and vibration-free operation of its internal combustion engine and which makes an embodiment with particularly low frictional losses possible in a simple way, with the result that it is particularly satisfactorily suitable for the intermittent operation of a hybrid drive as a result of spontaneous starting behavior and low susceptibility to wear. Moreover, it is to be connected to the generator of a hybrid drive to form a compact structural unit in a design which is space-saving and can be produced simply, with the result that there are new options for its arrangement in a vehicle.

According to the invention, the stated object is achieved on the basis of the characterizing features of patent claim 1.

In one preferred embodiment of the invention, in order to form an inwardly directed offset, the cylinder axes of the internal combustion engine which are parallel to one another are at a smaller spacing from one another than corresponds to the spacing between the axes of both crankshafts. This design firstly contributes to smaller dimensions of the machine and secondly brings about a reduction in the maximum transverse forces on the pistons and therefore lower piston friction and lower wear on the cylinder wall.

Furthermore, the assignment of in each case one crankshaft to one cylinder/piston unit makes it possible that, in one advantageous embodiment of the invention, both crankshafts are mounted in antifriction bearings in a low-friction manner, with the result that spontaneous starting of the machine takes place with a particularly low frictional resistance and low susceptibility to wear, and there is particularly satisfactory suitability for the intermittent operation of a hybrid drive as a result.

The particular suitability for the intermittent operation of a hybrid drive can be improved in a further embodiment of the invention by virtue of the fact that the housing of the internal combustion engine has a thermal insulation in addition to the measures for temperature control which are customary for machines of this type. An insulation of this type ensures that a cold start is avoided even after relatively long operational interruptions. Moreover, a thermal insulation of this type contributes to the further reduction of working noise of the machine.

The option for a largely independent arrangement of the machine combination according to the invention of compact design can be improved by virtue of the fact that the system of a dry sump lubrication is provided in the compact machine housing.

Furthermore, the degree of efficiency of the engine of a machine combination of this type can be improved by virtue of the fact that it is configured without throttle valves for full load operation, by its operating state being defined by its fuel supply which is controlled as a function of the power consumption of the current-generating electric machine.

In a further advantageous refinement of the invention, the cylinder head and the crankcase which is provided for the two crankshafts are formed as a unitary cast part, with the result that a cylinder head gasket and cylinder head bolts are avoided.

Figure 4:
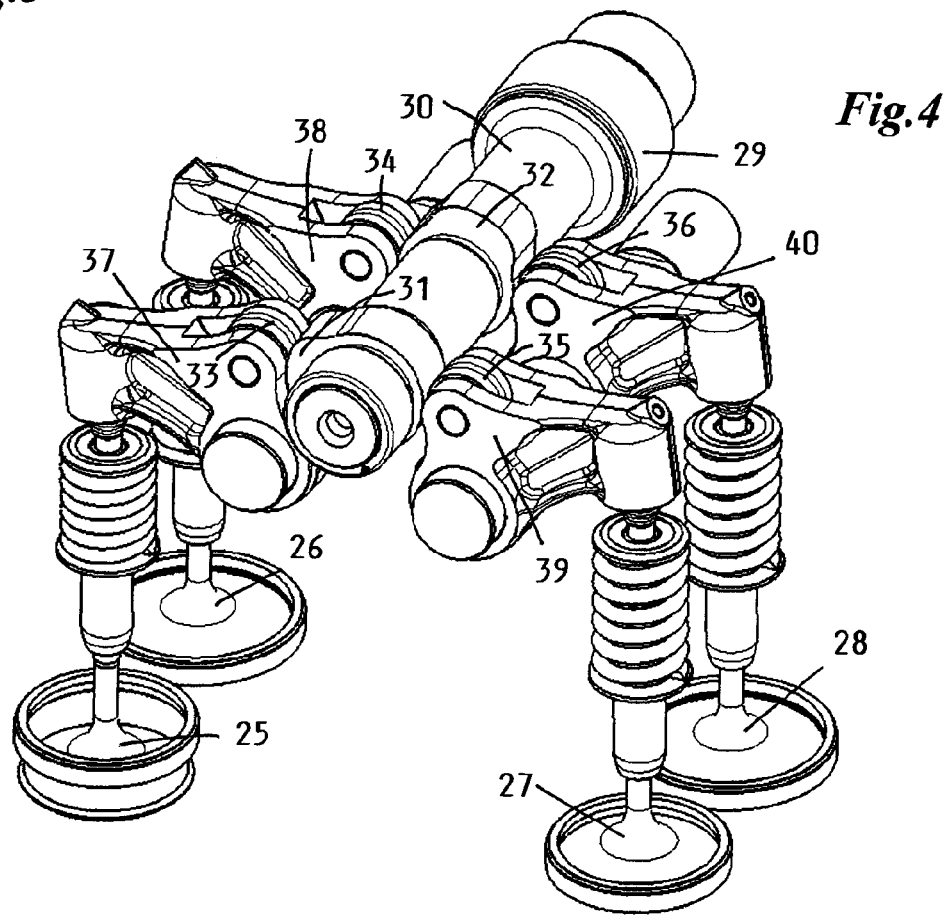
Figures 5, 6:
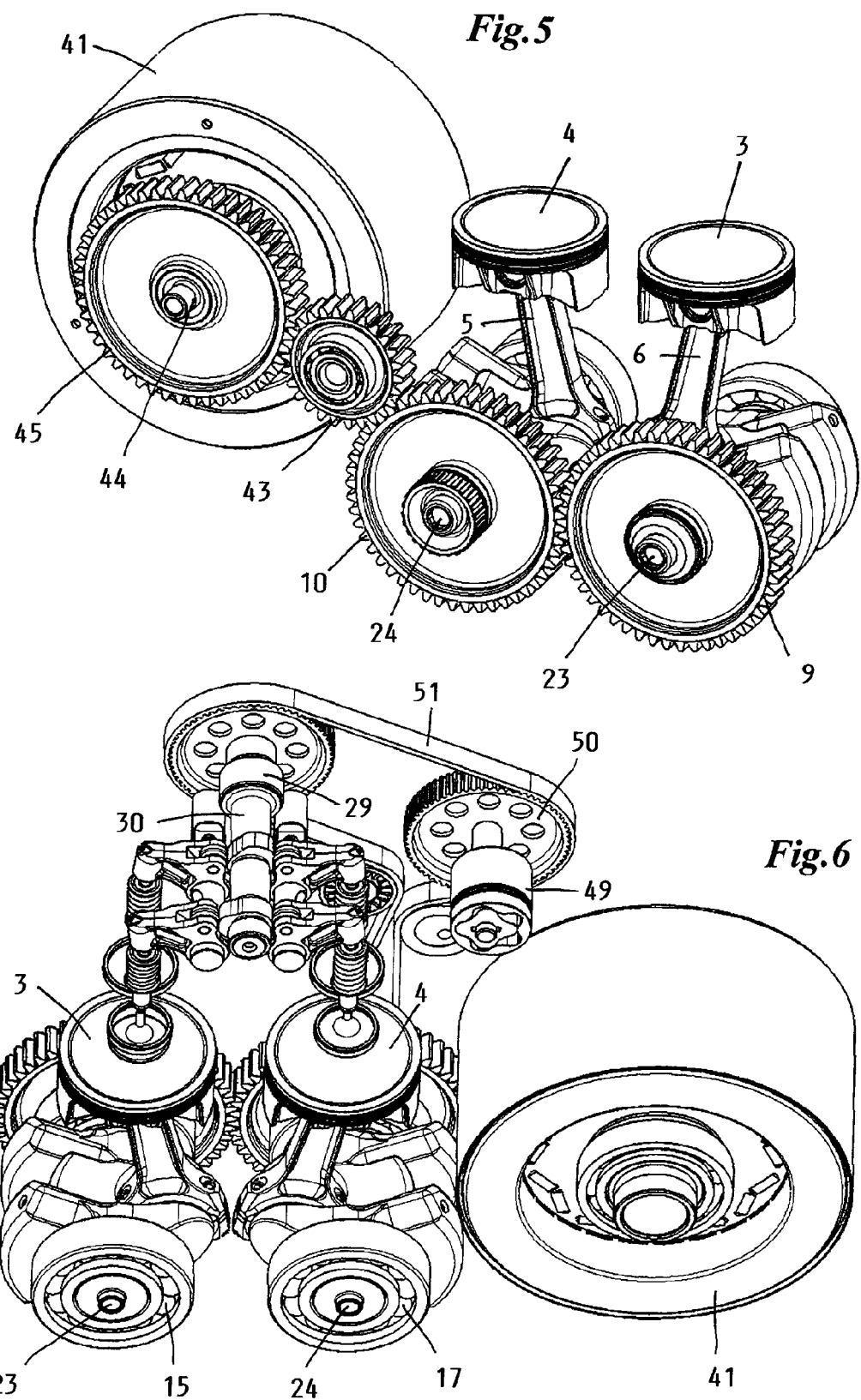
Figure 7:
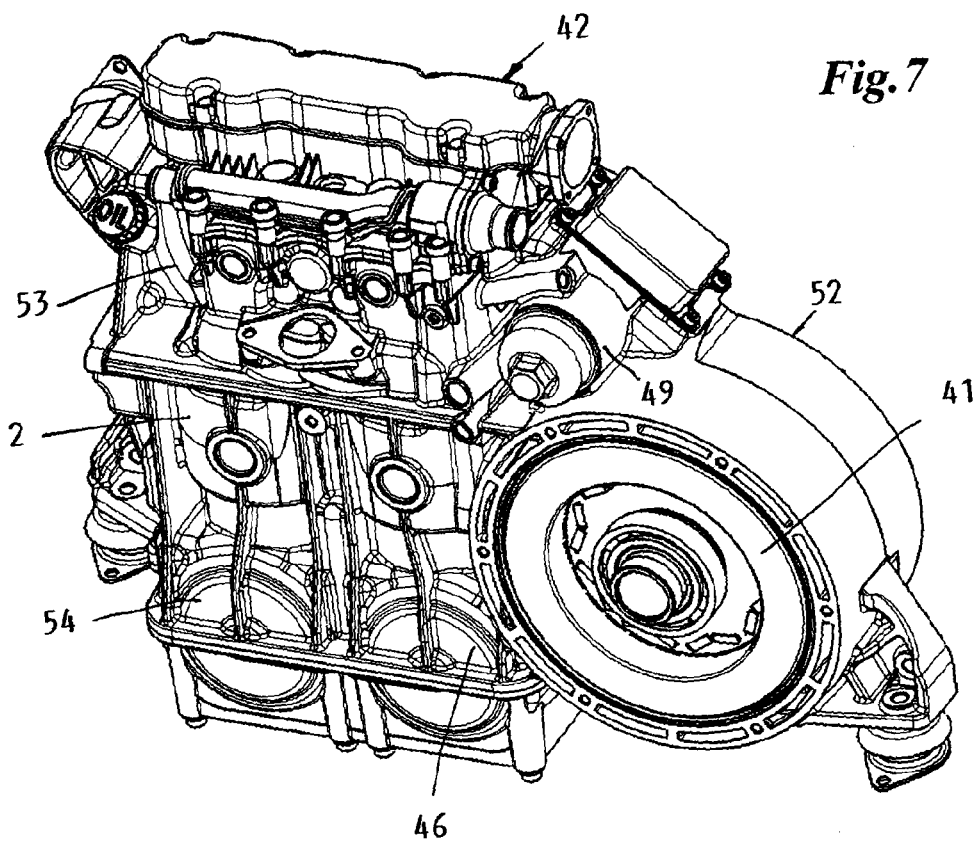
Figure 8:
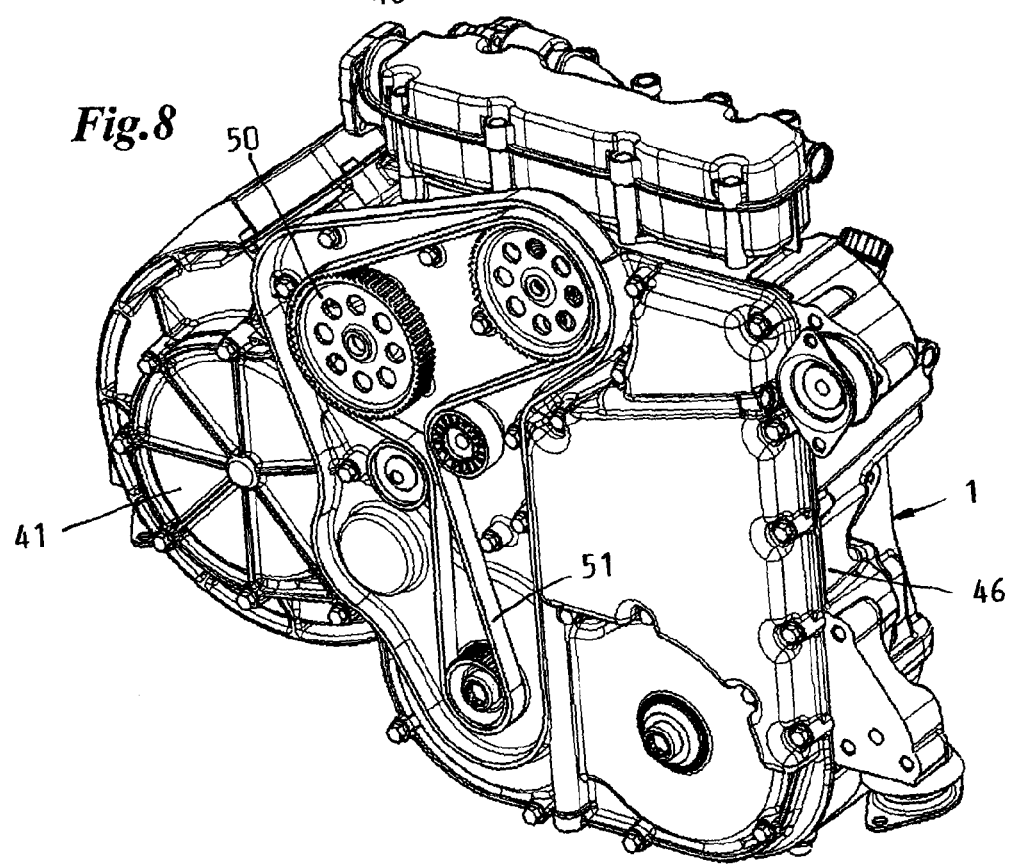

Further advantageous refinements and applications of the invention are the subject matter of dependent patent claims and can be gathered from the following description using the drawings, in which:

FIG. 1 shows a separate illustration of the opposed crankshafts of a machine according to the invention, with their gearwheel connection and the associated piston rods and pistons, FIG. 2 shows a diagrammatic illustration of the arrangement according to FIG. 1 with inlet and outlet channels which are guided through the housing of the machine or are cast into said housing, and with associated valve stems, FIG. 3 shows a diagrammatically illustrated plan view of the arrangement according to FIG. 2, FIG. 4 shows a separate, diagrammatic illustration of a camshaft control means of the two cylinder/piston units of a machine according to the invention, FIG. 5 shows an illustration of a combination of drive components of a machine according to FIGS. 1 to 4 with a generator which is arranged in-line, FIG. 6 shows the arrangement according to FIG. 5 with the valve control means according to FIG. 4 and a toothed belt drive for a suction pump and an oil pump of a dry sump lubrication means, FIG. 7 shows an overall view of an in-line combination of internal combustion engine and generator, FIG. 8 shows an overall view of the opposite side of the machine combination according to FIG. 7, FIG. 9 shows a separate view to illustrate the inwardly displaced, offset arrangement of the cylinder axes relative to the axes of the associated crankshafts, FIG. 10 shows a view of the narrow side of an insulating housing shell which encloses the machine, in a diagrammatic illustration, FIG. 11 shows a side view of the housing shell according to FIG. 10, and FIG. 12 shows an overall view of a combination of internal combustion engine and generator with a lateral arrangement of the generator relative to the internal combustion engine.

The internal combustion engine which is called a machine 1 in the following text has two cylinder/piston units which are arranged parallel to each other in a common housing 2, are controlled in the four-stroke method of operation, and the reciprocating pistons 3, 4 of which are drive-connected to in each case one dedicated crankshaft 7, 8 via in each case one connecting rod 5, 6.

Said crankshafts 7, 8 are for their part drive-connected so as to rotate in opposite directions via a gearwheel 9, 10 which is fastened on them coaxially, with the result that their oscillating inertial forces cancel one another out mutually and the machine 1 operates in a vibration-free manner without the use of a balancing shaft. To this end, the rotational position of the cranks 11, 12 and the rotational position of the balancing weights 13, 14 of one of the crankshafts 7 are offset by 180° with respect to those of the other crankshaft 8. As a result, the reciprocating pistons 3, 4 which act on them move parallel to one another. For an even method of operation, the associated working strokes of both cylinder/piston units are controlled at the spacing of a crankshaft rotation of 360°, with the result that the other piston 4 works in the intake stroke parallel to the working stroke of one of the pistons 3.

The crankshafts 7, 8 are mounted in each case in two antifriction bearings 15, 16 and 17, 18, with the result that the machine has low frictional resistances and is particularly suitable for intermittent operation.

A further reduction of frictional losses is achieved by an offset of the above-described crank mechanism, as is shown by the illustration in FIG. 3 and FIG. 9. As a result of the fact that the mutually parallel axes 19, 20 of the cylinders 21, 22 which are shown in FIG. 3 are at a smaller spacing from one another, in order to form an inwardly directed offset, than corresponds to the spacing between the axes 23, 24 of both crankshafts, the connecting rods 5, 6 have a steeper position, at the moment of the greatest action of force, than without an offset of this type, with the result that correspondingly lower transverse forces which influence the piston friction and the cylinder wear occur on the piston. Moreover, the closer arrangement of the piston/cylinder units next to one another, which closer arrangement is provided for said offset, contributes to the more compact design of the machine 1.

A further contribution to particularly low frictional losses of the machine 1 results from the use of a central camshaft 30 which controls the valves 25 to 28 of both cylinder/piston units and is likewise mounted in an antifriction bearing 29. The two cams 31, 32 of the camshaft 30 are followed in a low-friction manner in each case via following rollers 33 to 36 which are mounted on a lever arm of two-arm rocker arms 37 to 40 which are provided for each valve.

The illustrations of FIGS. 5 to 8 show how a machine 1 according to the invention can be combined in a particularly compact manner with a generator 41 to form a machine combination 42, in order to serve as energy source for a hybrid drive. The particularly compact design of a machine combination 42 of this type is possible via the spur gearwheels 9, 10 which connect both crankshafts 7, 8 to one another, by one of said gearwheels 10 being drive-connected directly or via an intermediate gearwheel 43 to a spur gearwheel 45 which is fastened on the shaft 44 of the generator 41. The illustrations of FIG. 5 to FIG. 8 show the flat and compact design which is possible as a result of a machine combination 42 of this type which is combined in a common, integrally formed housing 46.

Instead of an elongate, flat machine combination 42, a particularly compact machine combination 47 in accordance with the illustration in FIG. 12 can also be realized on the basis of the gearwheels 9, 10 which are provided in the machine 1, by a gearwheel of the generator 48 being provided, instead of in series with the gearwheels 9, 10 of the machine 1, above or in a triangular arrangement with respect to said gearwheels 9, 10, with the result that the generator 48 is situated closely next to the two piston/cylinder units of the machine 1.

In order for it to be possible to install the machine 1 or a machine combination 42 or 47 according to FIGS. 7 and 8 or FIG. 12 with even more structural and positional freedom in a hybrid vehicle, on account of its compact design, and in order to avoid a bottom oil sump which makes the compact design difficult, the machine according to the invention is preferably equipped with a dry sump lubrication means. This has a pump combination 49 comprising suction and pressure pump in the upper region of the machine 1 in accordance with the illustrations in FIGS. 6 to 8, which pump combination 49 is driven via a gearwheel 50 which is in engagement with a toothed belt drive 51. The required suction and pressure channels of the dry sump lubrication means are formed in the cast machine housing 2, 52.

Furthermore, the housing 2, 46, 52 which is provided for the machine 1 or the machine combination 42 is advantageously formed, including the cylinder head 53 and part of the crankcase 54, from a cast part made from lightweight metal with a formed gray cast iron lining of the cylinder faces, with the result that a cylinder head gasket with cylinder head bolts is avoided. Here, the exhaust gas pipes 54, 55 of both cylinders are combined within said unitary cast part in accordance with the diagrammatic illustrations in FIG. 2 and FIG. 3 and the intake pipes 56, 57 of the cylinders 21, 22 are guided obliquely with respect to the cylinder head, with the result that the swirling of the combustion air within the combustion chamber is aided. For double ignition which aids the combustion sequence, two spark plugs 58 to 61 are provided for each cylinder 21, 22 in the embodiment as a petrol engine.

In addition to the customary channel system (not shown in greater detail) for the circulation of a cooling medium in order to control the machine temperature, the machine has an outer, double-shell sheathing 62 made from a thermally insulating material, in accordance with the illustration in FIG. 10 and FIG. 11, with the result that a cold start is avoided even after relatively long operational interruptions. Moreover, a thermal insulation of this type contributes to the reduction of working noise of the machine. Moreover, said thermally insulating housing shell 62 can have a heating system with electric energy supply for the maintenance of a minimum value of the operating temperature.

The invention claimed is:

1. A machine combination comprising:
an internal combustion engine and a generator for charging a battery of a hybrid drive, the internal combustion engine having a pair of cylinder/piston units which are enclosed in a common housing and the two pistons of which are drive-connected via a connecting rod to in each case one dedicated crankshaft, and the two crankshafts being rotationally connected to one another so as to rotate in opposite directions via in each case one gearwheel, wherein the drive is transmitted from the crankshafts of the internal combustion engine to the drive shaft of the generator via gearwheels which are arranged in the same plane, both cylinder/piston units are arranged in-line with the generator, and the machine combination is enclosed in a common housing, the common housing comprising a cylinder head of the two cylinder/piston units, a crankcase which is provided for both crankshafts, and a generator housing and being formed as a unitary cast part;
wherein, in order to balance inertial forces of the internal combustion engine, the position of a crank of one of the crankshafts is offset by 180° with respect to that of the other crankshaft, and the work cycles of both cylinder/piston units follow one another at a spacing of a crankshaft rotation of 360°, and the geometric axes of both cylinder/piston units are situated in a common first plane which extends perpendicularly with respect to the crankshafts, and the circulating path of in each case two balancing weights of both crankshafts also runs in each case in the same plane which is parallel to the first plane as the balancing weights of the other crankshaft;

wherein, in order to form an inwardly directed offset, the cylinder axes which are parallel to one another are at a smaller spacing from one another compared to the spacing between the axes of both crankshafts.

2. The machine combination as claimed in claim 1, further comprising a thermally insulating housing shell for enclosing the machine combination.

3. The machine combination as claimed in claim 2, wherein, in order to maintain an operating temperature within a predefined range, the housing shell is connected to a thermostatically controlled heating system with an electric energy supply.

4. The machine combination as claimed in claim 1, wherein the planes, in which the circulating paths of the balancing weights of the crankshafts of both cylinder/piston units extend, run mirror-symmetrically with respect to a plane, in which both connecting rods move.

5. The machine combination as claimed in claim 1, wherein the crankshafts which are assigned in each case to one cylinder/piston unit are mounted in each case in two antifriction bearings.

6. The machine combination as claimed in claim 1, wherein a common camshaft with two cams which in each case act on rocker arms is provided for controlling in each case two valves of both cylinder/piston units.

7. The machine combination as claimed in claim 1, further comprising throttle valves for full load operation, an operating state being defined by a fuel supply which is controlled as a function of the power consumption of the current-generating electric machine.

8. The machine combination as claimed in claim 1, wherein, in order to supply it with lubricating oil, the channel system of a dry sump lubrication means is provided with an oil tank which is integrated into the common housing and a suction and pressure pump.

9. A machine combination for charging a battery of a hybrid drive, the machine combination comprising:
a common housing enclosing an internal combustion engine and a generator;
the internal combustion comprising
a pair of cylinders arranged in-line with the generator,
a pair of pistons, each piston disposed in a respective cylinder,
a pair of crankshafts disposed in a crankcase,
a pair of engine gear wheels, one engine gear wheel disposed on each crankshaft, and
a pair of connecting rods, each piston operatively connected to a respective crankshaft by a respective connecting rod, the crankshafts rotating in opposite directions and meshing the gears; and
the generator comprising
a drive shaft comprising a drive gear wheel, the drive gear wheel and the pair of engine gear wheels being disposed in a common plane to transmit a motive force;
wherein the common housing comprises a unitary cast part, the unitary cast part comprising cylinder heads for the pair of cylinders, the crankcase, and a housing portion of the generator;
wherein, in order to balance inertial forces of the internal combustion engine, the position of a crank of one of the crankshafts is offset by 180° with respect to that of the other crankshaft, and the work cycles of both of the respective pairs of cylinders and pistons follow one another at a spacing of a crankshaft rotation of 360°, and the geometric axes of both of the respective pairs of cylinders and pistons are situated in a common first plane which extends perpendicularly with respect to the crankshafts, and the circulating path of in each case two balancing weights of both crankshafts also runs in each case in the same plane which is parallel to the first plane as the balancing weights of the other crankshaft;
wherein, in order to form an inwardly directed offset, the cylinder axes which are parallel to one another are at a smaller spacing from one another compared to the spacing between the axes of both crankshafts.

10. The machine combination as claimed in claim 1, wherein the crankshafts which are assigned in each case to both of the respective pairs of cylinders and pistons are mounted in each case in two antifriction bearings.

11. The machine combination as claimed in claim 1, wherein a common camshaft with two cams which in each case act on rocker arms is provided for controlling in each case two valves of both of the respective pairs of cylinders and pistons.

12. The machine combination as claimed in claim 1, further comprising throttle valves for full load operation, an operating state being defined by a fuel supply which is controlled as a function of the power consumption of the current-generating electric machine.

13. The machine combination as claimed in claim 1, wherein in order to supply it with lubricating oil, the channel system of a dry sump lubrication means is provided with an oil tank which is integrated into the common housing and a suction and pressure pump.

14. The machine combination as claimed in claim 11, wherein the planes, in which the circulating paths of the balancing weights of the crankshafts of both cylinder/piston units extend, run mirror-symmetrically with respect to a plane, in which both connecting rods move.

15. The machine combination as claimed in claim 9, further comprising a thermally insulating housing shell for enclosing the machine combination.

16. The machine combination as claimed in claim 15, wherein, in order to maintain an operating temperature within a predefined range, the housing shell is connected to a thermostatically controlled heating system with an electric energy supply.

* * * * *